US008285282B2

(12) United States Patent
Joko et al.

(10) Patent No.: US 8,285,282 B2
(45) Date of Patent: Oct. 9, 2012

(54) RADIO COMMUNICATION SYSTEM, RADIO COMMUNICATION TERMINAL, RADIO BASE STATION AND RADIO COMMUNICATION METHOD

(75) Inventors: Shingo Joko, Yokohama (JP); Takeshi Toda, Yokohama (JP); Taku Nakayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 177 days.

(21) Appl. No.: 12/528,303

(22) PCT Filed: Feb. 20, 2008

(86) PCT No.: PCT/JP2008/052892
§ 371 (c)(1),
(2), (4) Date: Mar. 11, 2010

(87) PCT Pub. No.: WO2008/105299
PCT Pub. Date: Sep. 4, 2008

(65) Prior Publication Data
US 2010/0197303 A1      Aug. 5, 2010

(30) Foreign Application Priority Data
Feb. 23, 2007   (JP) ................................ 2007-044438

(51) Int. Cl.
*H04W 4/00*      (2009.01)
(52) U.S. Cl. ...................................................... 455/434
(58) Field of Classification Search .................... 455/434
See application file for complete search history.

(56) References Cited

U.S. PATENT DOCUMENTS

| | | | | |
|---|---|---|---|---|
| 2003/0157953 | A1* | 8/2003 | Das et al. | 455/522 |
| 2006/0153227 | A1* | 7/2006 | Hwang et al. | 370/465 |
| 2006/0203712 | A1* | 9/2006 | Lim et al. | 370/208 |
| 2008/0130605 | A1* | 6/2008 | Song et al. | 370/338 |
| 2008/0167075 | A1* | 7/2008 | Kurtz et al. | 455/561 |
| 2009/0296661 | A1* | 12/2009 | Lee et al. | 370/335 |
| 2010/0046413 | A1* | 2/2010 | Jin et al. | 370/315 |

OTHER PUBLICATIONS

IEEE, "Physical and Medium Access Control Layers for Combined Fixed and Mobile Operation in Licensed Bands" IEEE Std. 802.16-2005 and IEEE Std 802.16/2004/Cor1-2005 (Amendment and Corrigendum to IEEE Std 802.16/2004), pp. 1-864, Feb. 28, 2006.

* cited by examiner

*Primary Examiner* — Nathan Mitchell
(74) *Attorney, Agent, or Firm* — DLA Piper LLP (US)

(57) ABSTRACT

The radio commutation terminal (200) receives an AAS-DLFP which is transmitted by using a specific region and is associated with the control information, when the control information transmitted by using a map region is cannot toe received. The radio communication terminal (200) transmits a ranging code to a radio base station (100) to notify the reception of the AAS-DLFP, when the AAS-DLFP is received. The radio base station (100) transmits a private map for the radio communication terminal (200) to the radio communication terminal (200) toy a directional beam, when the ranging code is received from the radio communication terminal (200).

9 Claims, 6 Drawing Sheets

RADIO COMMUNICATION SYSTEM, RADIO COMMUNICATION TERMINAL, RADIO BASE STATION AND RADIO COMMUNICATION METHOD

CROSS REFERENCE TO THE RELATED APPLICATIONS

This application is a national stage of international application No. PCT/JP2008/052892 filed on Feb. 20, 2008, which also claims priority to and the benefit of Japanese Patent No. 2007-044438 filed on Feb. 23, 2007, the entire contents of which are incorporated herein by reference.

TECHNICAL FIELD

The present invention relates to a radio communication system, a radio communication, terminal, a radio base station and a radio communication method for transmitting and receiving control information necessary for setting radio communications by using a map region broadcasted by a non-directional beam and a specific region transmitted in a predetermined direction by a directional beam.

BACKGROUND ART

In recent years, a radio communication system capable of achieving high-speed communications by use of Orthogonal Frequency Division Multiplexing (OFDM) has been put to practical use. For example, Mobile WiMax defined in IEEE 802.16e is known as such a radio communication system.

In Mobile WiMAX, a radio communication terminal receives channel allocation information (DL-MAP and UL-MAP) broadcasted from a radio base station by a non-directional beam. The radio communication terminal acquires information on an uplink radio communication channel, specifically, a ranging sub-channel, on the basis of the received channel allocation information, and then transmits a ranging code (ranging information) by use of the ranging sub-channel.

Upon reception of the ranging code from the radio communication terminal, the radio base station allocates a frequency bandwidth necessary for communications to the radio communication terminal. Meanwhile, when the radio communication terminal cannot receive the channel allocation information transmitted through a map region in a downlink frame, for example, when the radio communication terminal cannot receive the channel allocation information because of being far from the radio base station, the radio communication terminal can acquire information on an uplink ranging sub-channel by referring to a specific region in the downlink frame, specifically, an AAS-DLFP (adaptive antenna system-downlink frame prefix) (refer to Non Patent Document 1). The AAS-DLFP (AAS pointer) is transmitted from the radio base station in a predetermined direction by a directional beam by use of an array antenna.

Non-Patent Document 1: "IEEE 802.16e-2005," [online], February 2006, [retrieved on Jan. 24, 2007], Internet URL: http://standards.ieee.org/getieee802/download/802.16e-2005.pd f

DISCLOSURE OF THE INVENTION

However, the following problem exists in the aforementioned conventional method of acquiring information on a ranging sub-channel. Specifically, since the radio base station cannot recognize whether or not the radio communication terminal can receive channel allocation information, the radio base station has to transmit information on an uplink radio communication channel, that is, a ranging sub-channel, by using; channel allocation information broadcasted by a non-directional beam, and an AAS-DLFP transmitted in a predetermined direction by a directional beam. This causes a problem that the allocatable region, for user data, in a downlink frame decreases, that is, the use efficiency of the downlink frame is deteriorated.

In this respect, the present invention has been made in consideration of the above described situation, and aims to provide a radio communication system, a radio communication terminal, a radio base station and a radio communication method that allow more reliable acquisition of information on an uplink, radio communication channel while improving the use efficiency of a downlink frame.

In order to solve the foregoing problems, the present invention includes characteristics described below. First, a first characteristic of the present invention is summarized as a radio communication system (a mobile communication system 1) including: a radio base station (a radio base station 100) configured to transmit control information (allocation of a sub-channel $CH_e$, modulation class, or coding, for example) necessary for setting radio communications, by using a map region (a region A1) broadcasted by a non-directional beam and a specific region (a region A2) transmitted in a predetermined direction by a directional beam (a directional beam B1); and a radio communication terminal (a radio communication terminal 200) configured to receive the control information from the radio base station, wherein the radio communication terminal comprises: a control information receiver (a radio communication unit 201) configured to receive pointer information (AAS-DLFPs 1 to 4) associated with the control information and transmitted by using the specific region when the radio communication terminal is incapable of receiving the control information transmitted by using the map region, and a reception notification unit (a channel controller 205) configured to transmit, to the radio base station, a reception notification (a ranging code) notifying a reception of the pointer information when the control information receiver receives the pointer information, and the radio base station comprises a control information transmitter (a channel controller 105) configured to transmit the control information to the radio communication terminal by using the specific region when the radio base station receives the reception notification from the radio communication terminal.

According to the radio communication system as described above, when receiving the reception notification from the radio communication terminal, the radio base station transmits the control information to the radio communication terminal by the specific region for which a directional beam is used.

That is, the radio base station does not have to transmit control information by the specific region except when receiving the reception notification from the radio communication terminal. Thus, the use efficiency of a downlink frame can be improved, specifically, the allocatable region of user data in a downlink frame can be increased.

Moreover, when receiving the reception notification from the radio communication terminal, the radio base station transmits control information to the radio communication terminal by using not a non-directional beam but a directional beam. Thus, the radio communication terminal can more surely acquire information on the radio communication channel.

A second characteristic of the present invention is summarized as a radio communication terminal (a radio communication terminal 200) configured to receive control information (allocation of a sub-channel CHS, modulation class, or coding, for example) used in execution of radio communications, and transmitted from a radio base station by using a map region (a region A1) broadcasted by a non-directional beam and a specific region (a region A2) transmitted in a predetermined direction by a directional beam (a directional beam B1), the radio communication terminal comprising: a control information receiver (a radio communication unit 201) configured to receive pointer information (AAS-DLFPs 1 to 4) associated with the control information and transmitted by using the specific region when the radio communication terminal is incapable of receiving the control information transmitted by using the map region; and a reception notification unit (a channel controller 205) configured to transmit, to the radio base station, a reception notification (a ranging code) notifying a reception of the pointer information when the control information receiver receives the pointer information.

A third characteristic of the present invention is summarized as a radio communication terminal according to the second characteristic, wherein the pointer information are associated with a different directional beams, and the reception notification unit transmits the reception notification including a type of the directional beam to the radio base station.

A fourth characteristic of the present invention is summarized as a radio communication terminal according to the second or third characteristic, wherein the radio communication terminal transmit a ranging information (a ranging code) necessary for setting radio communications to the radio base station, and the reception notification unit transmits the reception notification to the radio base station by including the reception notification into the ranging information.

A fifth characteristic of the present invention is summarized as a radio communication terminal according to the fourth characteristic, wherein the ranging information is formed of a plurality of codes, and the reception notification unit transmits a code corresponding to the reception notification to the radio base station.

A sixth characteristic of the present invention is summarized as a radio base station (a radio base station 100) configured to transmit control information (allocation of a sun-channel CHS, modulation class, or coding, for example) necessary for setting radio communications to a radio communication terminal (a radio communication terminal 200) by using a map region (a region A1) broadcasted by a non-directional beam and a specific region (a region A2) transmitted in a predetermined direction by a directional beam (a directional beam B1), wherein the radio communication terminal transmits, to the radio base station, a reception notification (a ranging code) notifying a reception of pointer information when the radio communication terminal receives the pointer information (AAS-DLFPs 1 to 4) associated with the control information, and the radio base station comprising a control information transmitter (a channel controller 105) configured to transmit the control information to the radio communication terminal by using the specific region when the radio base station receives the reception notification from the radio communication terminal.

A seventh characteristic of the present invention is summarized as a radio base station according to the sixth characteristic, wherein the control information transmitter transmits, to the radio communication terminal, the control information including an effective period of the control information.

An eighth characteristic of the present invention is summarized as a radio base station according to the sixth or seventh characteristic, wherein the control information, transmitter cancels transmission of the control information by using the map region when the radio base station receives the reception notification from the radio communication terminal.

A ninth characteristic of the present invention is summarized as a radio communication method used in a radio base station and a radio communication terminal, the radio base station configured to transmit control information necessary for setting radio communications, by using a map region broadcasted by a non-directional beam and a specific region transmitted in a predetermined direction by a directional beam, the radio communication terminal configured to receive the control information from the radio base station, the method comprising the steps of: receiving, by the radio communication terminal, pointer information associated with the control information and transmitted by using the specific region when the radio communication terminal is incapable of receiving the control information transmitted by using the map region; transmitting, by the radio communication terminal to the radio base station, a reception notification notifying a reception of the pointer information when the radio communication terminal receives the pointer information; and transmitting, by the radio base station to the radio communication terminal, the control information by using the specific region when the radio base station receives the reception notification from the radio communication terminal.

According to the aspect of the present invention, it is possible to provide a radio communication system, a radio communication terminal, a radio base station and a radio communication method that allow more reliable acquisition of information on an uplink radio communication channel while improving the use efficiency of a downlink frame.

BEST MODES FOR CARRYING OUT THE INVENTION

Next, an embodiment of the present invention will be described. Note that, the same or similar reference numerals are given to denote the same or similar portions in the descriptions of the drawings hereinafter. However, it should be noted that, since the drawings are schematic, dimensional proportions and the like are different from actual ones.

Accordingly, the specific sizes and the like should be judged by referring to the description below. Additionally, it goes without saying that there are some parts having dimensional relationships and dimensional proportions different from one drawing to another.

(Overall Schematic Configuration of Radio Communication System)

Figure 1:
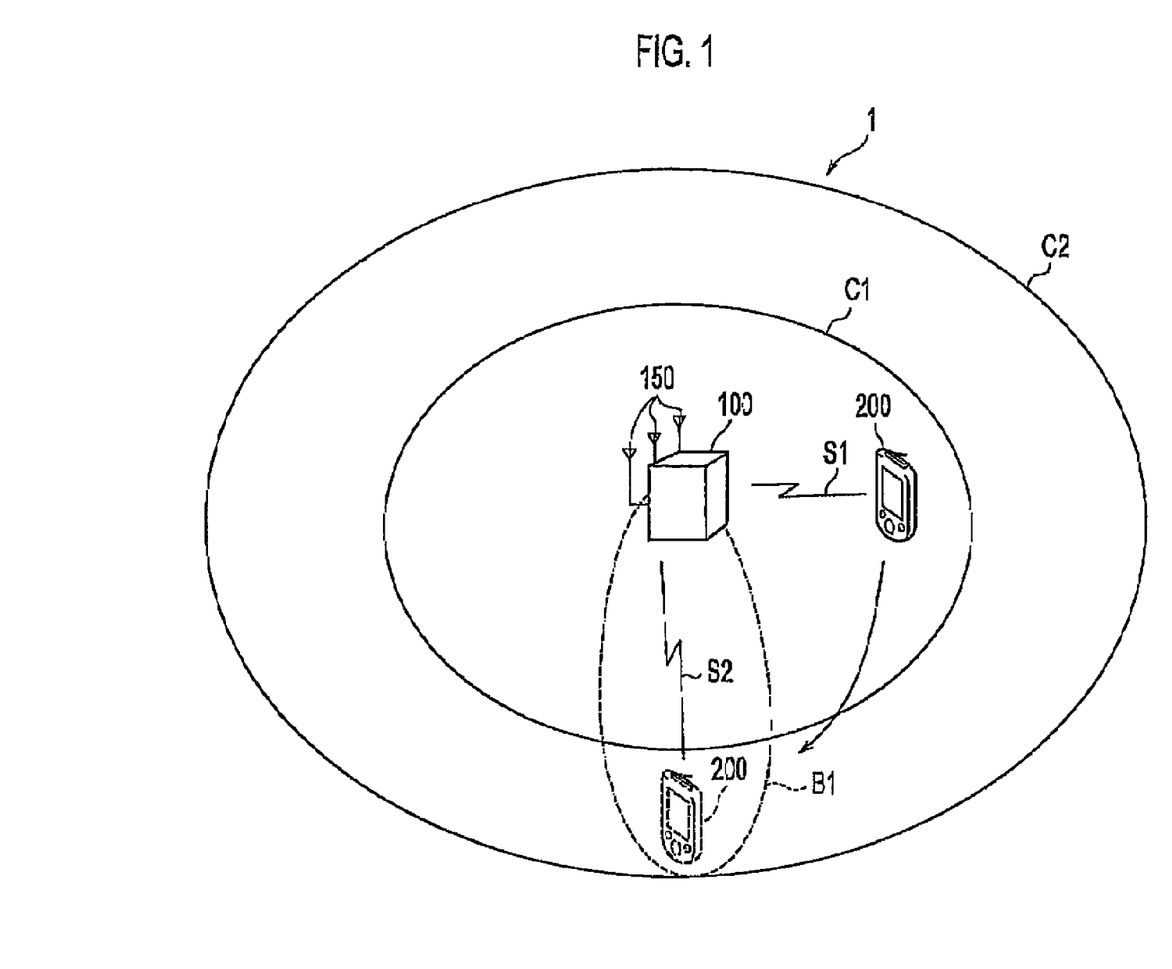
FIG. 1 is an overall schematic configuration diagram of a radio communication system according to an embodiment of the present invention.

FIG. 1 is an overall schematic configuration diagram of a mobile communication system 1 constituting a radio communication system according to the present embodiment. The mobile communication system 1 includes a radio base station 100 and a radio commutation terminal 200. Note that the numbers of radio base stations and radio communication terminals included in the mobile communication system 1 are not limited to the numbers shown in FIG. 1. The mobile communication system 1 is compliant with Mobile WiMAX defined in IEEE 802.16e. Specifically, the radio base station 100 and the radio communication terminal 200 transmit and receive radio signals S1 and S2 in accordance with Orthogonal Frequency Division Multiplexing (OFDM).

The radio base station 100 includes an array antenna 150 and is capable of transmitting the radio signal S2 by use of a directional beam B1. In addition, the radio base station 100 is capable of transmitting the radio signal S1 by use of a non-directional beam (not illustrated).

Moreover, the radio base station 100 transmits control information (allocation of a sub-channel $CH_E$, modulation claws, or coding, for example) by use of the radio signal S1 or the radio signal S2, the control information being necessary for setting radio communications with the radio communication terminal 200.

The radio signal S1 for which a non-directional beam is used reaches the radio communication terminal 200 located within a cell C1. The radio signal S2 for which a directional beam is used is subjected to beam-forming, and therefore reaches longer than a non-directional beam, specifically, reaches a radio communication terminal located within a cell C2.

The radio communication terminal 200 transmits and receives the radio signals S1 and S2 to and from the radio base station 100. The radio communication terminal 200 is a portable compact terminal and is equipped with a voice communication function and data communication functions (such as e-mail or FTP). Moreover, the radio communication terminal 200 receives, from the radio base station 100, the control information (allocation of a sub-channel $CH_S$, modulation class, or coding, for example) necessary for setting radio communications with the radio base station 100.

(Functional Block Configuration of Radio Communication System)

Figure 2:
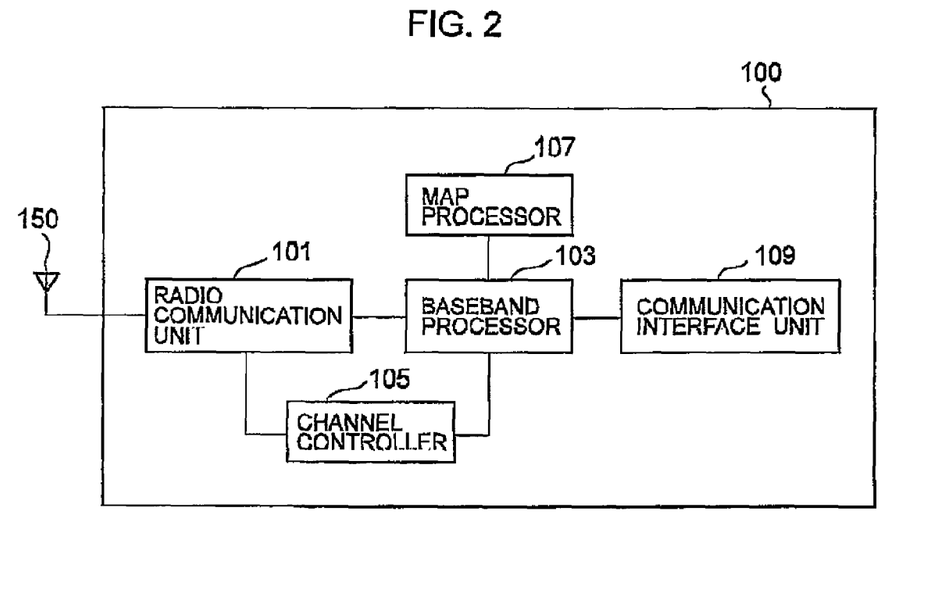
FIG. 2 is a functional block configuration diagram of a radio base station according to the embodiment of the present invention.
Figure 3:
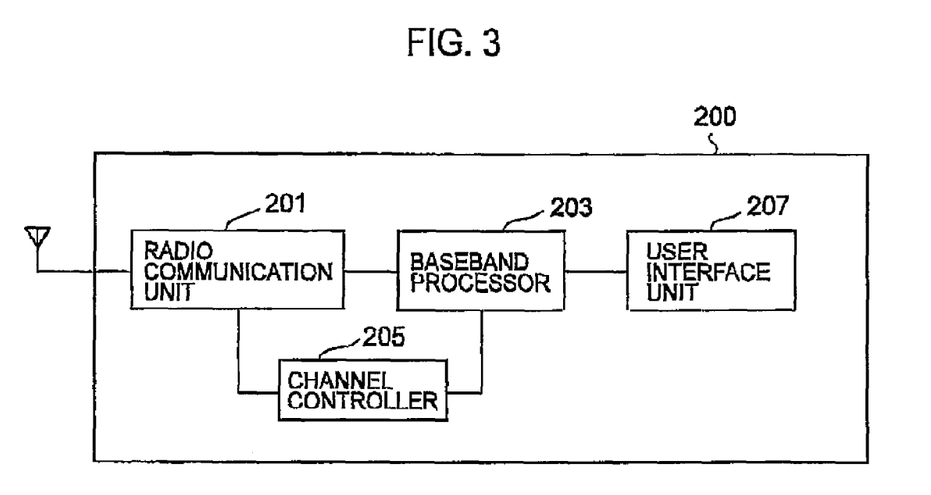
FIG. 3 is a functional block configuration diagram of a radio communication terminal according to the embodiment of the present invention.

Next, a description will be given of functional block configurations of the radio base station 100 and the radio communication terminal 200, which constitute the radio communication system according to the present embodiment, that is, the mobile communication system 1. FIG. 2 is a functional block, configuration, diagram of the radio base station 100. FIG. 3 is a functional block configuration diagram of the radio communication terminal 200.

(1) Radio Base Station 100

As shown in FIG. 2, the radio base station 100 includes a radio communication unit 101, a baseband processor 103, a channel controller 105, a map processor 107 and a communication interface unit 100.

The radio communication unit 101 transmits and receives the radio signals S1 and S2 in a predetermined frequency band (2.5 GHz band, for example) by use of the array antenna 150. Specifically, the radio communication, unit 101 is capable of forming the directional beam B1 or the non-directional beam by use of the array antenna 150.

Figure 5:
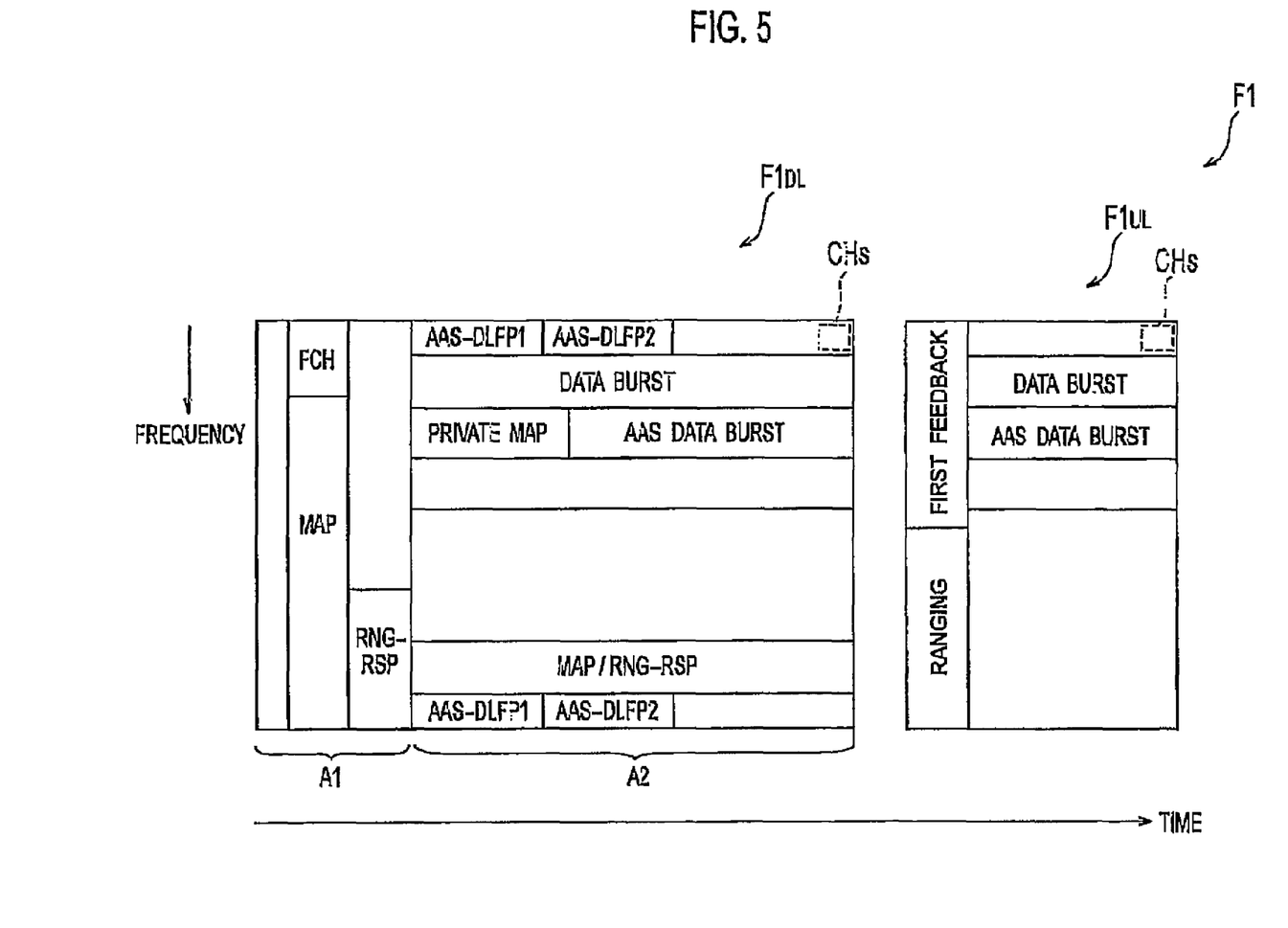
FIG. 5 is a diagram showing a structure example of a frame used in the embodiment of the present invention.

In this embodiment, a frame F1 having a structure as shown in FIG. 5 is transmitted and received with the radio signals S1 and S2. Note that, the specific structure of the frame F1 will be described later.

The baseband processor 103 is connected to the radio communication unit 101. The baseband processor 103 transmits data, that is, baseband signals such as user data or control data to the radio communication unit 101, and also demodulates the radio signals S1 and S2 received from the radio communication unit 101 into baseband signals.

The channel controller 105 executes allocation of a sub-channel $CH_S$ (refer to FIG. 5) included in the frame F1. As shown in FIG. 5, the frame F1 consists of a downlink sub-frame $F1_{DL}$ and an uplink sub-frame $F1_{DL}$.

The downlink sub-frame $F1_{DL}$ is consists of a region A1 and a region A2. As shown in FIG. 5, the sub-channel $CH_S$ is defined by a combination of a frequency and time (timing).

The region A1 is broadcasted by a non directional beam. In this embodiment, the region A1 corresponds to a map region. The region A2 is transmitted in a predetermined direction by the directional beam B1. In this embodiment, the region A2 corresponds to a specific region.

A map indicating allocation of a downlink sub-channel $CH_S$ (DL-MAP) and a map indicating allocation of an uplink sub-channel $CH_S$ (UL-MAP) are arranged in the region A1. In addition, a ranging response (RNG-RSP) to the radio communication terminal 200 is arranged in the region A1 when a ranging request, that is, a ranging code is received from the radio communication terminal 200.

A data burst and an AAS data burst, which are used in transmission and reception of user data, are arranged in the region A2. In addition, AAS-DLFPs (adaptive antenna system-down link frame prefixes) 1 to 4 are arranged in the region A2. The AAS DLFPs 1 to 4 (AAS pointers) are capable of pointing information unicasted by the directional beam B1, namely, a private map 30. In this embodiment, the AAS-DLFPs 1 to 4 correspond to pointer information. The AAS-DLFPs 1 to 4 can be associated with different directional beams B1 for the respective AAS-DLFPs. Specifically, the AAS-DLFPs 1 to 4 can be transmitted by the directional beams B1 having different transmission directions, respectively.

The radio communication terminal 200 that has received the AAS-DLFPs 1 to 4 acquires the private map 30 pointed by the AAS-DLFPs 1 to 4. Furthermore, the radio communication terminal 200 executes radio communications with the radio base station 100 on the basis of the control information such as allocation of a sub-channel $CH_S$, modulation class, and coding, which is indicated by the acquired private map 30.

Moreover, in this embodiment, the AAS-DLFP 1 to 4 can point a ranging sub-channel region (ranging sub-channel) included in the uplink sub-frame $F1_{DL}$. At the ranging sub-channel region, a ranging code (refer to FIG. 6) used for setting radio communications between the radio base station 100 and the radio communication terminal 200 is transmitted. In this embodiment, the ranging code forms ranging information. Note that, a configuration of the ranging code will be described later.

In addition, a map/RNG-RSP region is arranged in the region A2. The map/RNG-RSP region is pointed by specific AAS-DLFPs, for example, the AAS-DLFPs 3 and 4. The radio communication terminal 200 that has received the AAS-DLFPs 3 and 4 can acquire the map/RNG-RSP region pointed by the AAS-DLFPs 3 and 4.

The channel controller 105 transmits control information to the radio communication terminal 200 by use of the region A2 when the ranging code received from the radio communication terminal 200 is a reception notification indicating reception of the AAS-DLFP. Specifically, the channel controller 105 transmits the private map 30 to the radio communication terminal 200.

Moreover, the channel controller 105 can transmit the control information to the radio communication terminal 200 while including an effective period of the control information into the control information transmitted through the private map 30.

Furthermore, the channel controller 105 is capable of not including control information related to the radio communication terminal 200 into the control information transmitted by using the region A1, when the reception notification is received from the radio communication terminal 200, that is, when the ranging code received from the radio communication, terminal 200 is the reception notification indicating the reception of the AAS DLFP. Specifically, the channel controller 105 cancels transmission of applicable control information in the DL-MAPs.

The map processor 107 executes processing to generate maps (DL-MAP and UL-MAP) arranged in the region A1 and the private map 30 arranged in the region A2. The maps generated by the map processor 107 are transmitted by predetermined regions of the frame F1.

The communication interface unit 109 provides communication interface for connecting with a communication network (not illustrated), which connects multiple radio base stations.

(2) Radio Communication Terminal 200

As shown in FIG. 3, the radio communication terminal 200 includes a radio communication unit 201, a baseband processor 203, a channel controller 205 and a user interface unit 207.

The radio communication unit 201 transmits and receives the radio signals S1 and S2 in a predetermined frequency band (2.5 GHz band, for example). In particular, in this embodiment, when the radio communication unit 201 cannot receive control information transmitted by using the region A1 (refer to FIG. 5), that is, the control information included in the DL-MAP, the radio communication unit 201 receives AAS-DLFPs 1 to 14 (pointer information) transmitted by using the region A2 and associated with the control information. In this embodiment, the radio communication, unit 201 corresponds to a control information receiver.

The baseband processor 203 is connected to the radio communication unit 201. The baseband processor 203 transmits data, that is, baseband signals such as user data or control data to the radio communication unit 201, and also demodulates the radio signals S1 and S2 received from the radio communication unit 201 into baseband signals.

The channel controller 205 selects an applicable sub-channel $CH_S$ and determines a modulation class, on the basis of control information included in the radio signals S1 and S2 received from the radio base station 100.

In particular, in this embodiment, when the radio communication unit 201 receives any of the AAS-DLFPs 1 to 4 when the radio communication unit 201 cannot receive the control information included in a DL-MAP, the radio communication unit 201 transmits the ranging code (reception notification) to the radio base station 100, the ranging code notifying the reception of the AAS-DLFP. In this embodiment, the channel controller 205 corresponds to a reception notification unit.

Figure 6:
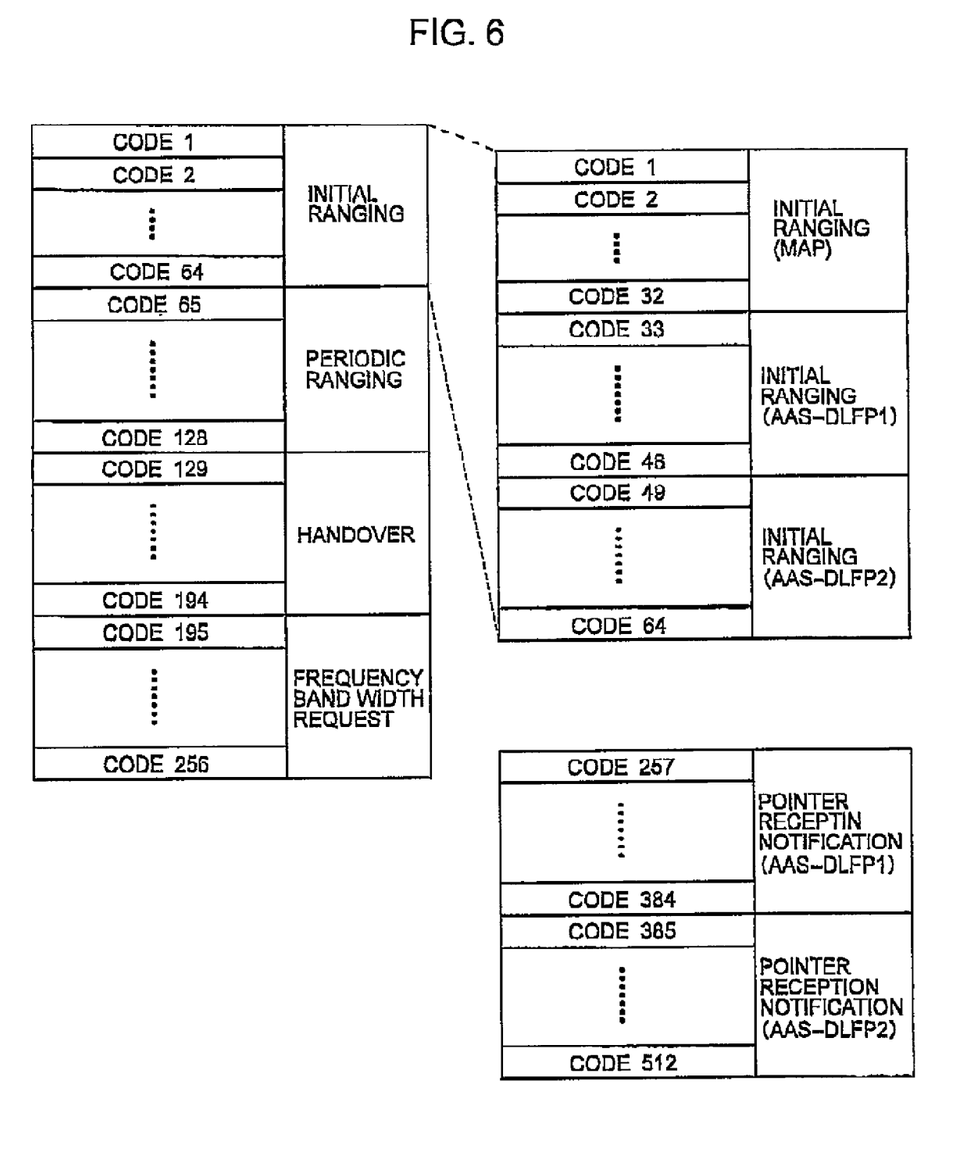
FIG. 6 is a diagram showing an example of an assignment of ranging codes used in the embodiment of the present invention.

FIG. 6 shows an example of the ranging codes used in this embodiment. As shown in FIG. 6, a standard ranging code of Mobile WiMAX is formed of multiple codes 1 to 256 (left side in the drawing). The channel controller 205 transmits ranging codes (ranging information) necessary for setting radio communications to the radio base station 100.

In accordance with "initial ranging" executed at the start of communications, "periodic ranging" executed during the communications, "handover" executed at the time of handover to another radio base station, and "frequency bandwidth request" executed at the time of a request for communication bandwidth, corresponding ranging codes are defined, respectively, as to ranging.

In this embodiment, as "initial ranging," for example, ranging codes are defined as follows (right side in the drawing): "initial ranging (map)" used when the radio communication terminal 200 receives a DL-MAP; "initial ranging (AAS-DLFP 1)" (codes 33 to 43) and "initial ranging (AAS-DLFP 2)" (codes 49 to 64) used when the radio communication terminal 200 cannot receive a DL-MAP and receives an AAS-DLFP. The ranging codes for "periodic ranging," "handover" and "frequency bandwidth request" are defined in the same manner.

In addition, in this embodiment, codes 257 to 512 are defined as a "pointer reception notification (AAS-DLFP 1)" and a "pointer reception notification (AAS-DLFP 2)," which indicates the reception of the AAS-DSFP when the radio communication terminal 200 cannot receive a DL-MAP and receives an AAS-DLFP (pointer information).

For example, when the radio communication terminal 200 cannot receive a DL-MAP and receives the AAS-DLFP 2, a code 385 is transmitted through a ranging sub-channel arranged at the ranging cub-channel region of the uplink sub-frame $F1_{UL}$. In other words, the channel controller 205 transmits a ranging code to the radio base station 100, the ranging code corresponding to the reception notification notifying the reception of the AAS-DLFP. Specifically, the channel controller 205 transmits the reception notification to the radio base station 100 by the ranging code corresponding to the reception notification, that is, by including the reception notification into the ranging information.

Moreover, the channel, controller 205 may transmit the reception notification to the radio base station 100 while including the type of the directional beam B1 with which the AAS-DLFP is received, into the notification.

The user interface unit 207 provides user interfaces necessary for a user of the radio communication terminal 200 to use the radio communication terminal 200 (operation keys, display, microphone, speaker and the like).

(Operation of Radio Communication System)

Next, a description will be given of an operation of the radio communication system according to the present embodiment, that is, the mobile communication system 1. Specifically, the description will be given of an operation of a case where the radio communication terminal 200 cannot receive a map (DL-MAP) arranged in the region A1 transmitted by a non-directional beam.

Figure 4:
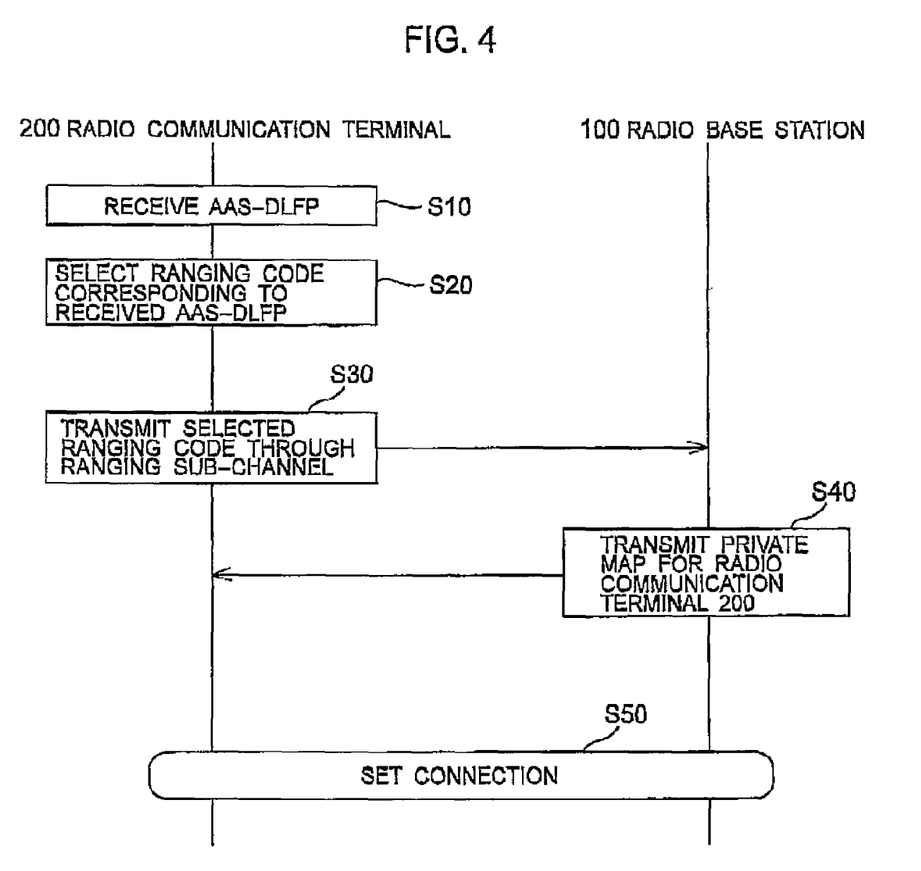
FIG. 4 is an operation flow of the radio communication system according to the embodiment of the present invention.

FIG. 4 shows a communication sequence of the mobile communication system 1 in the case where the radio communication terminal 200 cannot receive the map (DL-MAP) arranged in the region A1 transmitted by the non-directional beam.

As shown in FIG. 4, in step 310, the radio communication terminal 200 cannot receive the DL-MAP (refer to FIG. 5) arranged in the region A1 transmitted by the non-directional beam and then receives an AAS-DLFP (AAS-DLFP 2, for example).

In step S20, the radio communication terminal 200 selects a ranging code (code 385, for example) corresponding to the reception of the AAS-DLFP.

In step S30, the radio communication terminal 200 transmits the ranging code to the radio base station 100 through a ranging sub-channel pointed by the AAS-DLFP.

In step S40, the radio base station 100 transmits the private map 30 for the radio communication terminal 200 to the radio communication terminal 200 on the basis of the reception of the ranging code from the radio communication terminal 200 through the ranging sub-channel. Specifically, the radio base station 100 transmits the private map 30 to the radio communication terminal 200 by the directional beam B1.

In step S50, the radio communication terminal 200 sets connection with the radio base station 100 on the basis of the control information (allocation of a sub-channel $CH_E$, modulation class, or coding, for example) included in the received private map 30, and starts radio communications.

(Effects and Advantages)

According to the mobile communication system 1, when receiving a ranging code (reception notification) from the radio communication terminal 200, the radio base station 100 transmits control information to the radio communication terminal 200 by the region A2 for which the directional beam B1 is used.

In other words, the radio base station 100 has no need to transmit control information with the region A2 except a case where the radio base station 100 receives the ranging code from the radio communication terminal 200. Thus, the use efficiency of a downlink sub-frame $F1_{DL}$ is improved. Specifically, the allocatable region of user data in the downlink sub-frame $F1_{DL}$ can be increased.

In addition, when receiving the ranging code from the radio communication terminal 200, the radio base station 100 transmits control information by use of not the non-directional beam but the directional beam B1. Thus, the radio communication terminal 200 can more surely acquire information on the uplink and downlink sub-channel a $CH_S$.

In this embodiment, the AAS-DLFPs can be associated with different directional beams B1. Specifically, the radio communication terminal 200 (channel controller 205) can include the type, of the directional beam R1 with which the AAS-DLFP is received into the reception notification (ranging code) and then transmit the reception notification to the radio base station 100. Thus, the radio base station 100 can transmit control information by use of an appropriate directional beam B1 in accordance with the location of the radio communication terminal 200.

In this embodiment, by increasing the number of ranging codes (codes 257 to 512), "pointer reception notifications" each notifying the reception of the AAS-DLFP are associated with these codes. For this reason, there is no need to define a format of a new message for the reception notification notifying the reception of the AAS-DSFP. Thus, this technique can be easily introduced into the mobile communication system 1 without changing the standard of Mobile WiMAX to a large extent.

In this embodiment, the radio base station 100 (channel controller 105) can include an effective period of control information transmitted by the private map 30 into the control information, and then transmit the control information to the radio communication terminal 200. Thus, the radio communication terminal 200 can easily determine whether or not radio communications by using the received control information is executable.

In this embodiment, when the ranging code received from the radio communication terminal 200 is the reception notification indicating the reception of the AAS-DLFP, transmission of control information by using the region A1 can be canceled. Thus, the use efficiency of the downlink sub-frame $F1_{DL}$ is further improved. Specifically, the allocatable region of user data (data burst) in the downlink sub-frame $F1_{DL}$ can be further increased.

Other Embodiments

As described above, although contents of the present invention are disclosed through an embodiment of the present invention, any description or drawing constituting a part of this disclosure should not be understood as limiting the present invention. Various alternative embodiments will be apparent from, this disclosure to those skilled in the art.

Figure 7:
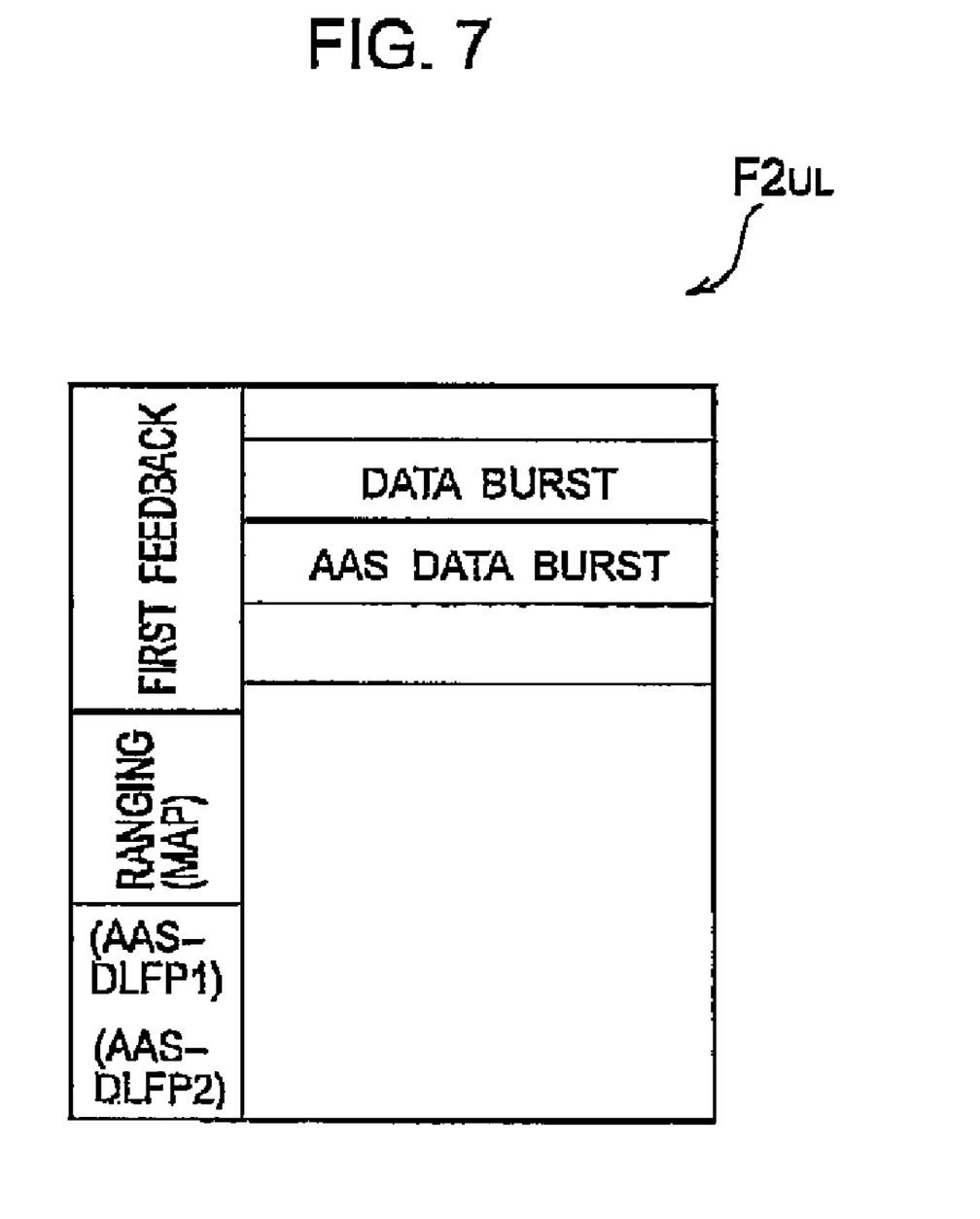
FIG. 7 is a diagram showing a structure example of a frame used in a modification example of the present invention.

For example, although the reception of an AAS-DLFP is notified by increasing the number of the ranging codes (codes 257 to 512) in the aforementioned embodiment, instead of increasing the number of the ranging codes, AAS-DLFPs may be associated with particular ranging sub-channels, respectively. FIG. 7 shows an example of an uplink sub-frame when AAS-DLFPs are associated with particular ranging sub-channels, respectively.

As shown in FIG. 7, the ranging sub-channel region is divided into three regions in an uplink sub-frame $F2_{DL}$. Specifically, the ranging sub-channel region is divided into: "ranging (map)" to be associated with a DL-MAP; "ranging (AAS-DLFP 1)" to be associated with the AAS-DLFP 1; and "ranging (AAS-DLFP 2)" to be associated with the AAS-DLFP 2.

For example, when receiving the AAS-DLFP 2, the radio communication terminal 200 notifies the reception of the AAS-DLFP 2 by using the ranging sub-channel associated with the AAS-DLFP 2.

Moreover, the increased ranging codes and "pointer reception notifications" each notifying that an AAS-DLFP is received are associated with one another in the aforementioned embodiment. However, instead of increasing the number of the ranging codes, messages each notifying the reception of the AAS-DLFPs may be individually transmitted.

Moreover, when the radio communication terminal 200 becomes capable of receiving a DL-MAP broadcasted by a non-directional beam, transmission of the private map 30 in the region A2 may be cancelled.

In addition, the aforementioned operation for a case where a DL-MAP cannot be received can be applied not only to the time when the communications start but also to a case where a DL-MAP becomes no longer receivable in the middle of communications, as a matter of course.

Moreover, the aforementioned radio base station 100 includes an apparatus that relays data transmitted and received between a radio base station and a radio communication terminal up to a high layer above a repeater, such as a relay station, for example, IEEE 802.16j (Mobile Multihop Belay Station).

As described above, it goes without saying that the present invention also includes various embodiments and the like which are not described herein. Accordingly, the technical scope of the present invention is only defined by the specific subject matters of the invention according to the scope of the invention as defined by the appended claims appropriate for this disclosure.

INDUSTRIAL APPLICABILITY

As described above, the communication system, the radio communication terminal, the radio base station and the radio communication method according to the present invention are advantageous in radio communications such as mobile communications because they allow more reliable acquisition of information on an uplink radio communication channel while improving the use efficiency of a downlink frame.

The invention claimed is:

1. A radio communication system comprising:
a radio base station configured to transmit first control information by using a map region broadcasted by a non-directional beam, and to transmit second control information by using a specific region transmitted in a predetermined direction by a directional beam; and
a radio communication terminal configured to receive the first control information and the second control information from the radio base station, wherein
the radio communication terminal comprises:
a control information receiver configured to receive pointer information associated with the second control information and transmitted by using the specific region when the radio communication terminal fails to receive the first control information transmitted by using the map region; and
a reception notification unit configured to transmit, to the radio base station, a reception notification notifying a reception of the pointer information when the control information receiver receives the pointer information, and
the radio base station comprises a control information transmitter configured to transmit the second control information to the radio communication terminal by using the specific region when the radio base station receives the reception notification from the radio communication terminal.

2. A radio communication terminal configured to receive first control information transmitted from a radio base station by using a map region broadcasted by a non-directional beam, and to receive second control information by using a specific region transmitted in a predetermined direction by a directional beam, the radio communication terminal comprising:
a control information receiver configured to receive pointer information associated with the second control information and transmitted by using the specific region when the radio communication terminal fails to receive the first control information transmitted by using the map region; and
a reception notification unit configured to transmit, to the radio base station, a reception notification notifying a reception of the pointer information when the control information receiver receives the pointer information.

3. A radio communication terminal configured to receive control information used in execution of radio communications, and transmitted from a radio base station by using a map region broadcasted by a non-directional beam and a specific region transmitted in a predetermined direction by a directional beam, the radio communication terminal comprising:
a control information receiver configured to receive pointer information associated with the control information and transmitted by using the specific region when the radio communication terminal is incapable of receiving the control information transmitted by using the map region; and
a reception notification unit configured to transmit, to the radio base station, a reception notification notifying a reception of the pointer information when the control information receiver receives the pointer information, wherein
the pointer information are associated with a different directional beams, and
the reception notification unit transmits the reception notification including a type of the directional beam to the radio base station.

4. A radio communication terminal configured to receive control information used in execution of radio communications, and transmitted from a radio base station by using a map region broadcasted by a non-directional beam and a specific region transmitted in a predetermined direction by a directional beam, the radio communication terminal comprising:
a control information receiver configured to receive pointer information associated with the control information and transmitted by using the specific region when the radio communication terminal is incapable of receiving the control information transmitted by using the map region; and
a reception notification unit configured to transmit, to the radio base station, a reception notification notifying a reception of the pointer information when the control information receiver receives the pointer information, wherein
the radio communication terminal transmits ranging information necessary for setting radio communications to the radio base station, and
the reception notification unit transmits the reception notification to the radio base station by including the reception notification into the ranging information.

5. The radio communication terminal according to claim 4, wherein
the ranging information is formed of a plurality of codes, and
the reception notification unit transmits a code corresponding to the reception notification to the radio base station.

6. A radio base station configured to transmit first control information by using a map region broadcasted by a non-directional beam, and to transmit second control information by using a specific region transmitted in a predetermined direction by a directional beam, the radio base station comprising:
a receiver configured to receive, from the radio communication terminal, a reception notification notifying a reception of pointer information when the radio communication terminal receives the pointer information associated with the second control information, and
a control information transmitter configured to transmit the second control information to the radio communication terminal by using the specific region when the radio base station receives the reception notification from the radio communication terminal.

7. The radio base station according to claim 6, wherein the control information transmitter transmits, to the radio communication terminal, the second control information including an effective period of the second control information.

8. A radio base station configured to transmit control information necessary for setting radio communications to a radio communication terminal by using a map region broadcasted by a non-directional beam and a specific region transmitted in a predetermined direction by a directional beam, wherein
the radio communication terminal transmits, to the radio base station, a reception notification notifying a reception of pointer information when the radio communication terminal receives the pointer information associated with the control information,
the radio base station comprising a control information transmitter configured to transmit the control information to the radio communication terminal by using the specific region when the radio base station receives the reception notification from the radio communication terminal, and the control information transmitter cancels transmission of the control information by using the map region when the radio base station receives the reception notification from the radio communication terminal.

9. A radio communication method used in a radio base station and a radio communication terminal, the radio base station configured to transmit first control information by using a map region broadcasted by a non-directional beam and to transmit second control information by using a specific region transmitted in a predetermined direction by a directional beam, the radio communication terminal configured to receive the first control information and the second control information from the radio base station, the method comprising the steps of:

receiving, by the radio communication terminal, pointer information associated with the second control information and transmitted by using the specific region when the radio communication terminal fails to receive the first control information transmitted by using the map region;

transmitting, by the radio communication terminal to the radio base station, a reception notification notifying a reception of the pointer information when the radio communication terminal receives the pointer information; and transmitting, by the radio base station to the radio communication terminal, the second control information by using the specific region when the radio base station receives the reception notification from the radio communication terminal.

* * * * *